(12) United States Patent
Tosaki et al.

(10) Patent No.: US 7,396,868 B2
(45) Date of Patent: Jul. 8, 2008

(54) AQUEOUS DISPERSION TYPE PRESSURE-SENSITIVE ADHESIVE COMPOSITION AND PRESSURE-SENSITIVE ADHESIVE PRODUCT

(75) Inventors: Yutaka Tosaki, Ibaraki (JP); Hideki Nagatsu, Ibaraki (JP); Shinichi Kouno, Ibaraki (JP); Takahiro Yatagai, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 247 days.

(21) Appl. No.: 10/616,916

(22) Filed: Jul. 11, 2003

(65) Prior Publication Data

US 2005/0075444 A1    Apr. 7, 2005

Related U.S. Application Data

(63) Continuation-in-part of application No. 10/364,371, filed on Feb. 12, 2003.

(30) Foreign Application Priority Data

Feb. 25, 2002 (JP) .......................... P. 2002-047984
Feb. 13, 2003 (JP) .......................... P. 2003-034518

(51) Int. Cl.
 *C09J 171/02* (2006.01)
 *C09J 119/00* (2006.01)
 *C09J 133/04* (2006.01)

(52) U.S. Cl. ...................... 524/377; 526/931

(58) Field of Classification Search ................. 524/377; 526/931
See application file for complete search history.

(56) References Cited

U.S. PATENT DOCUMENTS

| | | | |
|---|---|---|---|
| 3,645,835 A | 2/1972 | Hodgson | |
| 4,033,918 A | 7/1977 | Hauber | |
| 4,056,497 A | 11/1977 | Reinecke et al. | |
| 4,076,661 A | 2/1978 | Kassner | |
| 4,128,518 A | 12/1978 | Oyamada et al. | |
| 4,226,915 A * | 10/1980 | Iijima et al. ................. | 428/492 |
| RE31,886 E | 5/1985 | Hodgson | |
| RE31,887 E | 5/1985 | Hodgson | |
| 4,659,771 A | 4/1987 | Craig | |
| 4,670,505 A | 6/1987 | Craig | |
| 4,694,056 A | 9/1987 | Lenney | |
| 4,725,639 A | 2/1988 | Lenney | |
| 5,319,020 A * | 6/1994 | Rosenski et al. ............. | 524/762 |
| 5,338,814 A | 8/1994 | Wu et al. | |
| 5,350,631 A | 9/1994 | Tseng et al. | |
| 5,571,617 A | 11/1996 | Cooprider et al. | |
| 5,834,538 A | 11/1998 | deHullu et al. | |
| 5,952,000 A | 9/1999 | Venkateshwaran et al. | |
| 6,001,913 A | 12/1999 | Thames et al. | |

FOREIGN PATENT DOCUMENTS

| | | |
|---|---|---|
| GB | 1 280 631 A | 7/1972 |
| GB | 1 409 594 A | 10/1975 |
| JP | 60-245651 A | 12/1985 |
| JP | 61-254678 A | 11/1986 |
| JP | 63-227682 | 7/1988 |
| JP | 63-317575 | 12/1988 |
| JP | 02-006584 A | 1/1990 |
| JP | 03-079671 A | 4/1991 |
| JP | 08-053652 A | 2/1996 |
| JP | 04-103653 A | 4/1996 |
| JP | 8-120251 | 5/1996 |
| JP | 8-157783 | 6/1996 |
| JP | 08-217946 A | 6/1996 |
| JP | 08-245706 A | 9/1996 |
| JP | 08245706 A | 9/1996 |
| JP | 10-330693 A | 12/1996 |
| JP | 10-158609 | 6/1998 |
| JP | 10158620 A | 6/1998 |
| JP | 10-292162 | 11/1998 |
| JP | 2000-239633 | 9/2000 |
| JP | 2001-172579 | 6/2001 |
| JP | 2001172579 A * | 6/2001 |
| JP | 2001-515091 A | 9/2001 |
| JP | 2002-155251 A | 5/2002 |
| JP | 2003-503539 A | 1/2003 |
| JP | 2003-041124 A | 2/2003 |
| WO | 99/11728 A1 | 3/1999 |
| WO | 00/78884 A1 | 12/2000 |

OTHER PUBLICATIONS

Korean Office Action; dated Apr. 25, 2007.
Translation for JP 0824576 (Sep. 1996).
Translation for JP 1015862 (Jun. 1998).

* cited by examiner

*Primary Examiner*—Kelechi C Egwim
(74) *Attorney, Agent, or Firm*—Sughrue Mion, PLLC

(57) ABSTRACT

An aqueous dispersion type pressure-sensitive adhesive composition contains a polyalkylene glycol having a weight-average molecular weight of from 20,000 to 5,000,000 or at least one hydrophilic polymer selected from the group consisting of polyvinylpyrrolidone, poly(vinyl alcohol)s, and poly((meth)acrylic acid) in an amount of from 0.5 to 15 parts by weight per 100 parts by weight, on a solid basis, of the acrylic or rubber-based pressure-sensitive adhesive composition of the aqueous dispersion type; and a pressure-sensitive adhesive product contains a pressure-sensitive adhesive layer formed from the aqueous dispersion type pressure-sensitive adhesive composition.

2 Claims, No Drawings

AQUEOUS DISPERSION TYPE PRESSURE-SENSITIVE ADHESIVE COMPOSITION AND PRESSURE-SENSITIVE ADHESIVE PRODUCT

CROSS REFERENCE TO RELATED APPLICATION

This is a continuation-in-part application of Ser. No. 10/364,371 filed Feb. 12, 2003.

FIELD OF THE INVENTION

The present invention relates to an aqueous dispersion type pressure-sensitive adhesive composition and a pressure-sensitive adhesive product.

BACKGROUND OF THE INVENTION

Pressure-sensitive adhesives are extensively used in masking tapes, double-faced pressure-sensitive adhesive tapes, surface-protective films, packaging tapes, and the like. Developments in pressure-sensitive adhesives of the aqueous dispersion type containing no organic solvent have hitherto been proceeding from the standpoints of a measure for environmental preservation, resource saving, safety, etc., and the amount of the aqueous dispersion type pressure-sensitive adhesives to be used tends to increase. Of such aqueous dispersion type pressure-sensitive adhesives, rubber-based pressure-sensitive adhesives of the aqueous dispersion type are most extensively used at present as they have advantages such as reduced limitations on adherend selection and excellent low-temperature adhesiveness. Acrylic pressure-sensitive adhesives of the aqueous dispersion type are coming to be widely used in place of the conventional rubber-based pressure-sensitive adhesives of the aqueous dispersion type because of their excellent adhesive properties, weatherability, etc.

On the other hand, masking tapes, for example, have had the following problem. When a masking tape, which is a tape for masking adherends on the occasion of painting, sealing or the like, is applied in the rainy season or low-temperature winter season to an adherend surface where dew condensation has formed, sufficient adhesive force sometimes cannot be obtained at the time of its application and the tape shifts or peels, resulting in poor workability.

Double-faced pressure-sensitive adhesive tapes and the like also have had the same problem in application to dewy surfaces.

A pressure-sensitive adhesive tape containing a water-soluble polymer as a major component has been disclosed as an adhesive tape having good adhesiveness to dewy surfaces.

However, satisfactory results have been unobtainable because low-molecular weight components, which have been dissolved away as a result of water absorption/swelling, cause fouling upon peeling, the adhesive's insufficient cohesive force leaves adhesive residues upon peeling, and so on.

Further, as a pressure-sensitive adhesive which exhibits excellent adhesiveness in humid places or when applied to surfaces covered with water, frost, ice, etc., the one comprising an acrylic acid ester copolymer obtained by emulsion polymerization and a specific amount of a polyethylene glycol having a weight average molecular weight of from 180 to 1,100 is known (cf. Japanese Patent Laid-Open No. 227682/1988). However, there has been a problem that the pressure-sensitive adhesive comprising such components as above can not give sufficient initial pressure-sensitive adhesive force toward dewy surfaces, and so on.

In addition, when a masking tape is applied on an adherend and left as it is for several days, peeling slowly starts from the end of the tape (constant-load peeling property) during this period. This has been a problem of poor workability upon restarting the work.

SUMMARY OF THE INVENTION

Accordingly, an object of the invention is to provide an aqueous dispersion type pressure-sensitive adhesive composition and a pressure-sensitive adhesive product which are capable of exhibiting satisfactory initial pressure-sensitive adhesive force when applied to dewy or wet surfaces and excellent in constant-load peeling property.

The inventors made intensive investigations in order to accomplish the above object. As a result, it has been found that when a specific polyalkylene glycol or a specific hydrophilic polymer is added in a specific amount to an aqueous dispersion type pressure-sensitive adhesive composition, the initial pressure-sensitive adhesive force of the adhesive in application to dewy or wet surfaces is improved together with its constant-load peeling property. The invention has been thus completed.

The invention provides an aqueous dispersion type pressure-sensitive adhesive composition which contains a polyalkylene glycol having a weight average molecular weight of from 20,000 to 5,000,000 in an amount of from 0.5 to 15 parts by weight per 100 parts by weight, on a solid basis, of the acrylic or rubber-based pressure-sensitive adhesive composition of the aqueous dispersion type. The invention also provides an aqueous dispersion type pressure-sensitive adhesive composition which contains at least one hydrophilic polymer selected from the group consisting of polyvinylpyrrolidone, poly(vinyl alcohol)s, and poly((meth)acrylic acid) in an amount of from 0.5 to 15 parts by weight per 100 parts by weight, on a solid basis, of an acrylic or rubber-based pressure-sensitive adhesive composition of the aqueous dispersion type.

The acrylic pressure-sensitive adhesive composition of the aqueous dispersion type preferably contains as a base polymer an acrylic polymer comprising a $C_{4-12}$ alkyl ester of (meth)acrylic acid as a main monomer component. The hydrophilic polymer may have a weight-average molecular weight of from 500 to 5,000,000.

The invention further provides a pressure-sensitive adhesive product which has a pressure-sensitive adhesive layer formed from the aqueous dispersion type pressure-sensitive adhesive composition described above. This pressure-sensitive adhesive layer formed from the aqueous dispersion type pressure-sensitive adhesive composition may be disposed on at least one side of a porous base material.

DETAILED DESCRIPTION OF THE INVENTION

Aqueous Dispersion Type Pressure-Sensitive Adhesive Composition

The acrylic or rubber-based pressure-sensitive adhesive composition of the aqueous dispersion type contains an acrylic pressure-sensitive adhesive composition of the aqueous dispersion type and a rubber-based pressure-sensitive adhesive composition of the aqueous dispersion type. Acrylic or rubber-based pressure-sensitive adhesive compositions of the aqueous dispersion type can be used alone or in combination of two or more thereof.

The acrylic pressure-sensitive adhesive composition of the aqueous dispersion type comprises an acrylic pressure-sensitive adhesive containing an acrylic polymer as a base polymer. This acrylic polymer comprises (meth)acrylic acid esters as the main monomer components and may optionally contain a copolymerizable monomer as a comonomer. Such acrylic polymers can be used alone or in combination of two or more thereof. Preferably used as the (meth)acrylic acid ester for forming the main monomer component is, for example, a $C_{4-12}$ alkyl ester of (meth)acrylic acid.

Examples of the $C_{4-12}$ alkyl ester of (meth)acrylic acid include n-butyl(meth)acrylate, isobutyl(meth)acrylate, sec-butyl(meth)acrylate, t-butyl(meth)acrylate, pentyl(meth)acrylate, isopentyl(meth)acrylate, neopentyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, isononyl(meth)acrylate, decyl(meth)acrylate, isodecyl(meth)acrylate, undecyl(meth)acrylate, dodecyl(meth)acrylate, etc. Such $C_{4-12}$ alkyl esters of (meth)acrylic acid can be used alone or in combination of two or more thereof. The term "(meth)acrylic" as used herein refers to "acrylic and/or methacrylic", and the term "(meth)acrylate" as used herein refers to "acrylate and/or methacrylate".

The $C_{4-12}$ alkyl esters of (meth)acrylic acid are preferably incorporated as the main monomer component in the acrylic polymer. It is, therefore, important that the proportion of the $C_{4-12}$ alkyl esters of (meth)acrylic acid be 50% by weight or higher, preferably 60% by weight or higher, and more preferably 70% by weight or higher, based on all monomer components in the acrylic polymer. The upper limit of the proportion of the $C_{4-12}$ alkyl esters of (meth)acrylic acid is not particularly limited and may be, for example, 100% by weight (preferably 99% by weight, more preferably 98% by weight) based on all monomer components in the acrylic polymer. Consequently, the proportion of the $C_{4-12}$ alkyl esters of (meth)acrylic acid may be, for example, from 50 to 98% by weight based on all monomer components. When the proportion of the $C_{4-12}$ alkyl esters of (meth)acrylic acid is lower than 50% by weight based on all monomer components, there are cases where a pressure-sensitive adhesive showing satisfactory peel force and cohesive force cannot be obtained.

Preferred in the invention among the $C_{4-12}$ alkyl esters of (meth)acrylic acid enumerated above are butyl acrylate, 2-ethylhexyl acrylate, isononyl acrylate, dodecyl acrylate (lauryl acrylate), butyl methacrylate, and dodecyl methacrylate(lauryl methacrylate).

Copolymerizable monomers to be incorporated as comonomer components in the acrylic polymer are suitably selected according to the kinds of the $C_{4-12}$ alkyl esters of (meth)acrylic acid, etc. Examples of the monomers copolymerizable with the $C_{4-12}$ alkyl esters of (meth)acrylic acid include $C_{1-3}$ alkyl esters of (meth)acrylic acid, such as methyl(meth)acrylate, ethyl(meth)acrylate, n-propyl(meth)acrylate, isopropyl(meth)acrylate, etc.; $C_{13-18}$ alkyl esters of (meth)acrylic acid, such as tridecyl(meth)acrylate, tetradecyl(meth)acrylate, pentadecyl(meth)acrylate, hexadecyl(meth)acrylate, stearyl(meth)acrylate, etc.; (meth)acrylic acid alicyclic hydrocarbon esters such as cyclohexyl(meth)acrylate, bornyl(meth)acrylate, isobornyl(meth)acrylate, etc.; carboxyl-containing monomers such as (meth)acrylic acid, itaconic acid, maleic acid, fumaric acid, crotonic acid, isocrotonic acid, etc. or the anhydrides thereof; sulfo-containing monomers such as sodium vinylsulfonate, etc.; aromatic vinyl compounds such as styrene, substituted styrenes, etc.; cyano-containing monomers such as acrylonitrile, etc.; olefins such as ethylene, butadiene, etc.; vinyl esters such as vinyl acetate, etc.; vinyl chloride; amide-containing monomers such as acrylamide, methacrylamide, N-vinylpyrrolidone, N,N-dimethyl(meth)acrylamide, etc.; hydroxyl-containing monomers such as hydroxyalkyl(meth)acrylates, glycerol dimethacrylate, etc.; amino-containing monomers such as aminoethyl(meth)acrylate, (meth)acryloylmorpholine, etc.; imide group-containing monomers such as cyclohexylmaleimide, isopropylmaleimide, etc.; epoxy-containing monomers such as glycidyl(meth)acrylate, methylglycidyl(meth)acrylate, etc.; and isocyanate-containing monomers such as 2-methacryloyloxyethyl isocyanate, etc.; and the like. Examples of the copolymerizable monomers, which may also be used, include polyfunctional copolymerizable monomers (polyfunctional monomers) such as triethylene glycol di(meth)acrylate, diethylene glycol di(meth)acrylate, ethylene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, etc. The copolymerizable monomers may be used alone or in combination of two or more thereof.

Such copolymerizable monomers may be used in such an amount that the proportion of the components to be formed therefrom is lower than 50% by weight based on all monomer components.

In the invention, a crosslinking agent may be used in place of (or together with) any of the polyfunctional monomers shown above. This crosslinking agent can be added after polymerization for acrylic polymer production and before application to an adherend, so as to improve the cohesive force of the pressure-sensitive adhesive. As this crosslinking agent, a crosslinking agent for ordinary use, for example, either a water-soluble crosslinking agent or an oil-soluble crosslinking agent, can be used. A single crosslinking agent or a combination of two or more crosslinking agents is usable. Specific examples of the water-soluble crosslinking agent include epoxy crosslinking agents such as polyethylene glycol diglycidyl ether, etc., water-dispersible isocyanate crosslinking agents, oxazoline crosslinking agents, aziridine crosslinking agents, hydrophilized carbodiimide crosslinking agents, crosslinking agents containing an active methylol group or active alkoxymethyl group, metal chelate crosslinking agents, melamine resin crosslinking agents, and peroxide crosslinking agents, and the like. Examples of the oil-soluble crosslinking agent include epoxy crosslinking agents such as N,N,N',N'-tetraglycidyl-m-xylenediamine, etc., isocyanate crosslinking agents such as hexamethylene diisocyanate, etc., oil-soluble carbodiimide crosslinking agents, and the like. The amount of the crosslinking agent to be used is not particularly limited, and it may be the amount generally used for acrylic pressure-sensitive adhesives.

The acrylic polymer can be produced from the monomers shown above by a known or usual polymerization method (especially an emulsion polymerization method). Furthermore, such methods as an en bloc charging method (an en bloc polymerization method), monomer dropping method, monomer emulsion dropping method, or the like can be used. In the case where monomers and other components are added dropwise, they may be dropped continuously or in portions. A polymerization temperature can be suitably selected, for example, from the range of from 5 to 100° C. according to the kind of the polymerization initiator, etc.

Examples of the polymerization initiator for use in the polymerization include azo initiators such as 2,2'-azobisisobutyronitrile, 2,2'-azobis(2-amidinopropane)dihydrochloride, 2,2'-azobis[2-(5-methyl-2-imidazolin-2-yl)propane]dihydrochloride, 2,2'-azobis(2-methylpropionamidine)disulfate, 2,2'-azobis(N,N'-dimethyleneisobutyramidine)

dihydrochloride, etc.; persulfates such as potassium persulfate, ammonium persulfate, etc.; peroxide initiators such as benzoyl peroxide, t-butyl hydroperoxide, hydrogen peroxide, etc.; redox initiators comprising a combination of a peroxide and a reducing agent, such as a combination of a persulfate and sodium hydrogen sulfite, a combination of a peroxide and sodium ascorbate, etc.; and the like. However, the polymerization initiator should not be construed as being limited to these. The polymerization initiator may be a water-soluble initiator or an oil-soluble initiator. The amount of the polymerization initiator to be used may be suitably selected according to the kind thereof, kinds of the monomers, etc. In general, it can be selected from the range of, for example, about from 0.01 to one part by weight per 100 parts by weight of the monomer components.

A chain-transfer agent may be used for the polymerization. By using a chain-transfer agent, the molecular weight of the acrylic polymer can be regulated. Examples of the chain-transfer agent include ordinary chain-transfer agents such as lauryl mercaptan, glycidyl mercaptan, 2-mercaptoethanol, thioglycolic acid, 2-ethylhexyl thioglycolate, 2,3-dimethyl-capto-1-propanol, etc.

These may be used alone or in combination of two or more thereof. The amount of the chain-transfer agent to be used is generally about from 0.001 to 0.5 part by weight per 100 parts by weight of the monomer components.

An emulsifying agent can be further used in the polymerization for the purpose of securing polymerization stability. Examples of emulsifying agents usable for this purpose include anionic emulsifying agents such as sodium lauryl sulfate, ammonium lauryl sulfate, sodium dodecylbenzenesulfonate, sodium polyoxyethylene alkyl ether sulfates, ammonium polyoxyethylene alkylphenyl ether sulfates, sodium polyoxyethylene alkylphenyl ether sulfates, sodium polyoxyethylene alkyl sulfosuccinates, etc.; nonionic emulsifying agents such as polyoxyethylene alkyl ethers, polyoxyethylene alkylphenyl ethers, polyoxyethylene fatty acid esters, polyoxyethylene/polyoxypropylene block polymers, etc.; and the like. Also usable are radical-polymerizable emulsifying agents obtained by incorporating a radical-reactive group such as a propenyl group, etc. into these emulsifying agents. Such emulsifying agents may be used alone or in combination of two or more thereof. The amount of the emulsifying agent to be used is, for example, preferably 0.5 part by weight or larger, more preferably 1.0 part by weight or larger, per 100 parts by weight of the monomer components from the standpoints of polymerization stability and mechanical stability. On the other hand, from the standpoint of improving water resistance, the amount thereof is preferably 5 parts by weight or smaller, more preferably 3 parts by weight or smaller.

The monomer composition and the amount or proportion of each monomer to be used can be suitably selected as long as the acrylic polymer comprising the $C_{4-12}$ alkyl ester of (meth)acrylic acid as the main monomer component is obtained. It is, however, desirable for attaining satisfactory pressure-sensitive adhesive properties that a monomer composition and proportions thereof be determined so as to yield a polymer having a glass transition point ($T_g$) of generally −20° C. or lower.

The weight-average molecular weight of the acrylic polymer may be about 200,000 or higher (e.g., from 200,000 to 1,000,000), preferably about from 250,000 to 900,000, more preferably about from 300,000 to 800,000.

In the acrylic pressure-sensitive adhesive, the acrylic polymer is contained in an aqueous dispersion state.

Therefore, the acrylic polymer may be contained in the form of an emulsion. In the case where the acrylic polymer is contained in an emulsion form, an emulsified acrylic polymer may be prepared by optionally using an emulsifying agent in producing the acrylic polymer through polymerization. Alternatively, an acrylic polymer produced by any of various polymerization methods may be emulsified with an emulsifying agent. Namely, the emulsion containing an acrylic polymer may be an acrylic-polymer emulsion obtained by the emulsion polymerization of a $C_{4-12}$ alkyl ester of (meth)acrylic acid optionally with a copolymerizable monomer, or may be an acrylic-polymer emulsion prepared by obtaining an acrylic polymer by a polymerization method other than emulsion polymerization and then dispersing the polymer in water with an emulsifying agent.

On the other hand, the rubber-based pressure-sensitive adhesive composition of the aqueous dispersion type is constituted of a rubber-based pressure-sensitive adhesive comprising a natural-rubber latex as the main component. This rubber-based pressure-sensitive adhesive may contain, according to need, a latex of natural rubber which has been masticated or to which an acrylic or another monomer has been grafted.

In the aqueous dispersion type pressure-sensitive adhesive composition, the acrylic pressure-sensitive adhesive composition of the aqueous dispersion type can be an aqueous dispersion type pressure-sensitive adhesive containing an acrylic pressure-sensitive adhesive as the main component, while the rubber-based pressure-sensitive adhesive composition of the aqueous dispersion type can be an aqueous dispersion type pressure-sensitive adhesive composition containing a rubber-based pressure-sensitive adhesive as the main component.

The acrylic or rubber-based adhesive composition of the aqueous dispersion type may contain, according to need, a base (e.g., ammonia water, etc.) or acid for pH regulation and further contain additives usually used in pressure-sensitive adhesives. Examples of such additives include peelability regulators, tackifiers, plasticizers, softeners, fillers, colorants (e.g., pigments, dyes, etc.), antioxidants, surfactants, and the like.

Polyalkylene Glycol Hydrophilic Polymer

A polyalkylene glycol having a weight average molecular weight of from 20,000 to 5,000,000 or a hydrophilic polymer is contained in the aqueous dispersion type pressure-sensitive adhesive composition of the invention in an amount of from 0.5 to 15 parts by weight (preferably from 1 to 13 parts by weight, more preferably from 1.5 to 10 parts by weight) per 100 parts by weight, on a solid basis, of the acrylic or rubber-based pressure-sensitive adhesive composition of the aqueous dispersion type. When the proportion of the polyalkylene glycol having a weight average molecular weight of from 20,000 to 5,000,000 or the hydrophilic polymer is less than 0.5 part by weight per 100 parts by weight, on a solid basis, of the aqueous dispersion type pressure-sensitive adhesive composition, the effects of improving pressure-sensitive adhesive force in application to dewy or wet surfaces and of improving constant-load peeling property lessen. On the other hand, proportions thereof higher than 15 parts by weight result in an increased viscosity of the pressure-sensitive adhesive, which sometimes affects its applicability. Any method may be used for incorporating the polyalkylene glycol having a weight-average molecular weight of from 20,000 to 5,000,000 or the hydrophilic polymer, as long as it is contained together with an acrylic pressure-sensitive adhesive or rubber-based pressure-sensitive adhesive. For example, in the case of an acrylic pressure-sensitive adhesive composition of the aqueous dispersion type, the polyalkylene glycol or hydrophilic polymer may be incorporated before an acrylic polymer for constituting the acrylic pressure-sensitive adhesive is polymerized. However, for avoiding adverse effects on the polymerization for acrylic polymer production, it is preferred to add the polyalkylene glycol or hydrophilic polymer in the form of an aqueous solution after the polymerization for acrylic polymer production.

It is important that the polyalkylene glycol has a weight average molecular weight of from 20,000 to 5,000,000 (preferably from 100,000 to 3,000,000, more preferably from 450,000 to 1,000,000). When the weight-average molecular weight of the polyalkylene glycol is less than 20,000, the effects of improving pressure-sensitive adhesive force in application to dewy or wet surfaces lessen. On the other hand, the weight-average molecular weight of over 5,000,000 causes a problem of increasing the viscosity of the pressure-sensitive adhesive and adversely affects its applicability.

Examples of the above polyalkylene glycol include homopolymers such as polyethylene glycol, polypropylene glycol, polytetramethylene glycol, etc.; and copolymers such as ethylene glycol/propylene glycol copolymers, etc. Among these, polyethylene glycol is especially preferable as the polyalkylene glycol from the viewpoint of a good balance among the addition amount thereof, effect of improving adhesive force in application to dewy or wet surfaces, applicability, etc.

As the hydrophilic polymer, at least a polymer selected from polyvinylpyrrolidone, poly(vinyl alcohol), and poly((meth)acrylic acid) can be used. Preferred as the polyvinylpyrrolidone is polyvinylpyrrolidone as a homopolymer. However, copolymers of vinylpyrrolidone with another copolymerizable monomer also can be used as long as they are hydrophilic. As the poly(vinyl alcohol), a known or ordinary poly(vinyl alcohol) can be used. The poly(vinyl alcohol) is not particularly limited in the degree of saponification as long as it is hydrophilic. As the poly((meth)acrylic acid), a homopolymer such as poly(acrylic acid), poly(methacrylic acid), etc. or a copolymer such as an acrylic acid/methacrylic acid copolymer, etc. can be used. Besides these, copolymers of acrylic acid and/or methacrylic acid with another copolymerizable monomer are also usable as long as they are hydrophilic. These hydrophilic polymers can be used alone or in combination of two or more thereof.

The weight-average molecular weight of the hydrophilic polymer is not particularly limited, and can be selected in the range of, for example, about from $0.5 \times 10^3$ to $5 \times 10^6$ (preferably about from $0.8 \times 10^3$ to $3 \times 10^6$, more preferably about from $1 \times 10^3$ to $1 \times 10^6$). When the weight-average molecular weight of the hydrophilic polymer is too low, there are cases where the effects of improving pressure-sensitive adhesive force in application to dewy or wet surfaces lessen. On the other hand, too high weight-average molecular weights thereof result in an increased viscosity of the pressure-sensitive adhesive, which may adversely affect applicability. In the case where the weight-average molecular weight of the hydrophilic polymer is from $1 \times 10^3$ to $1 \times 10^6$, a highly excellent balance is obtained between the effect of improving adhesive force in application to dewy or wet surfaces and the applicability.

An especially preferred example of the hydrophilic polymer is polyvinylpyrrolidone from the viewpoints of a good balance among the addition amount thereof, weight-average molecular weight, effect of improving adhesive force in application to dewy or wet surfaces, applicability, etc.

The aqueous dispersion type pressure-sensitive adhesive composition of the invention (i.e., the aqueous dispersion type pressure-sensitive adhesive composition containing a polyalkylene glycol having a weight-average molecular weight of from 20,000 to 5,000,000 or a hydrophilic polymer) contains a polyalkylene glycol having a weight-average molecular weight of from 20,000 to 5,000,000 or at least one hydrophilic polymer selected from polyvinylpyrrolidone, poly(vinyl alcohol)s, and poly((meth)acrylic acid) in an amount of from 0.5 to 15 parts by weight per 100 parts by weight, on a solid basis, of the acrylic or rubber-based pressure-sensitive adhesive composition of the aqueous dispersion type. Because of this, the adhesive composition of the invention can exhibit satisfactory initial pressure-sensitive adhesive force when applied to dewy or wet surfaces although it is an aqueous dispersion type pressure-sensitive adhesive composition. In addition, the composition is excellent in constant-load peeling property. Furthermore, the pressure-sensitive adhesive, during peeling, is inhibited or prevented from posing the problem of fouling due to low-molecular weight components dissolved away as a result of water absorption/swelling or the problem of leaving an adhesive residue due to insufficient cohesive force. Since the acrylic or rubber-based pressure-sensitive adhesive is an aqueous composition, it is desirable from the standpoints of safety, environmental hygiene, etc. Besides, the pressure-sensitive adhesive properties inherent in the acrylic or rubber-based pressure-sensitive adhesive remain intact or almost intact, and the excellent pressure-sensitive adhesive properties inherent in the acrylic or rubber-based pressure-sensitive adhesive can be exhibited. Therefore, the aqueous dispersion type pressure-sensitive adhesive composition of the invention is useful as an aqueous dispersion type pressure-sensitive adhesive for forming a pressure-sensitive adhesive layer in a pressure-sensitive adhesive product.

Pressure-Sensitive Adhesive Product

Examples of the pressure-sensitive adhesive product of the invention include pressure-sensitive adhesive tapes, pressure-sensitive adhesive sheets, pressure-sensitive adhesive films, pressure-sensitive adhesive labels, etc. The pressure-sensitive adhesive product has a pressure-sensitive adhesive layer formed from the aqueous dispersion type pressure-sensitive adhesive composition containing the polyalkylene glycol having a weight-average molecular weight of from 20,000 to 5,000,000 or the hydrophilic polymer as above. This pressure-sensitive adhesive layer formed from the aqueous dispersion type pressure-sensitive adhesive composition containing the polyalkylene glycol having a weight-average molecular weight of from 20,000 to 5,000,000 or the hydrophilic polymer may be disposed, for example, on at least one side of a base material or on a release film. Namely, the pressure-sensitive adhesive product either may have or may not have a base material, as long as it comprises a pressure-sensitive adhesive layer formed from the aqueous dispersion type pressure-sensitive adhesive composition containing the polyalkylene glycol having a weight-average molecular weight of from 20,000 to 5,000,000 or the hydrophilic polymer.

Examples of the base material include plastic films such as polyolefin films (polyethylene film, polypropylene film, ethylene/propylene copolymer films, etc.), polyester films, polyimide films, poly(vinyl chloride) films, poly(vinyl acetate) films, etc.; metal foils; porous base materials, and the like. In the invention, it is preferred to use a porous base material as the base material. Examples of the porous base material include porous paper base materials such as Japanese paper, kraft paper, crepe paper, etc.; porous fabric base materials such as nonwoven fabrics, woven fabrics, and the like. Especially effective base materials of these in improving initial pressure-sensitive adhesive force in application to dewy or wet surfaces are: Japanese paper in the case where the pressure-sensitive adhesive product is a masking tape; and a nonwoven fabric in the case where the pressure-sensitive adhesive product is a pressure-sensitive adhesive tape such as a double-faced pressure-sensitive adhesive tape, etc.

Preferred Japanese paper is the one made from a beaten wood pulp or from a mixture of the wood pulp with short synthetic fibers. Examples of the synthetic polymer constituting the short synthetic fibers include various synthetic polymers such as vinylon, nylons, polyesters, polypropylene, poly(vinyl chloride), etc.

As the nonwoven fabric, the one produced by sheet forming from general fibers and a pulp can be used.

The basis weight of the porous base material is not particularly limited and may be, for example, about from 5 to 200 g/m². More specifically, the basis weight of the porous base material is generally about from 20 to 100 g/m² in the case where the porous base material is Japanese paper, and is generally about from 10 to 20 g/m² in the case of a nonwoven fabric.

The base material can have a thickness suitably selected according to the target pressure-sensitive adhesive product. For example, the thickness thereof may be about from 5 to 300 μm. More specifically, the thickness of the base material is preferably from 40 to 200 μm (especially from 50 to 100 μm) in the case of a Japanese paper base material and is generally from 30 to 50 μm in the case of a nonwoven fabric base material, from the standpoints of strength, nerve, etc.

The base material may have a single-layer or multilayer constitution.

The base material (especially the porous base material) may be subjected to an impregnation treatment or filling treatment and any of various known or usual treatments, e.g., a release treatment, etc., according to purposes.

The pressure-sensitive adhesive product of the invention can be produced by an ordinary process for producing pressure-sensitive adhesive products, depending on the kind of the pressure-sensitive adhesive product. For example, in the case where the pressure-sensitive adhesive product has a base material, it can be produced by subjecting the base material to such treatments as prime coating, back sizing or a backside treatment, etc., directly applying the aqueous dispersion type pressure-sensitive adhesive composition containing the aforementioned polyalkylene glycol having a weight-average molecular weight of from 20,000 to 5,000,000 or hydrophilic polymer to at least one side (one side or both sides) of the base material in a thickness of about from 5 to 300 μm on a dry basis, and then drying the coating. Alternatively, the product can be obtained by applying the pressure-sensitive adhesive composition to a release liner in a thickness of about from 5 to 300 μm on a dry basis, drying the coating, and then transferring the dried coating to the base material. Thus, the pressure-sensitive adhesive product (e.g., a pressure-sensitive adhesive tape in a roll form) can be produced.

For applying the aqueous dispersion type pressure-sensitive adhesive composition, a coater in common use can be employed, e.g., a gravure roll coater, reverse-roll coater, kiss-roll coater, dip roll coater, bar coater, knife coater, spray coater or the like.

It is desirable in the invention that a release film be superposed on the pressure-sensitive adhesive layer in order to protect the pressure-sensitive adhesive. In the case where a release film is not used, it is preferred that the backside of the base material is subjected to a treatment with a release agent such as a silicone release agent, long-chain-alkyl release agent, etc.

The aqueous dispersion type pressure-sensitive adhesive composition of the invention can exhibit satisfactory initial pressure-sensitive adhesive force when applied to dewy or wet surfaces and favorable constant-load peeling property.

The invention will be explained below in more detail by reference to Examples, but the invention should not be construed as being limited by these Examples. Hereinafter, all parts are by weight.

(Preparation Example of Acrylic Pressure-Sensitive Adhesive)

Into a reaction vessel equipped with a thermometer, stirrer, nitrogen introduction tube, and reflux condenser was introduced an emulsion prepared by emulsifying 46 parts of 2-ethylhexyl acrylate, 2.5 parts of butyl acrylate, one part of acrylonitrile, 0.5 part of acrylic acid, and one part of sodium lauryl sulfate in 75 parts of water. Nitrogen displacement was conducted at room temperature (25° C.) for one hour while stirring. Thereto was then added 0.025 part of 2,2'-azobis(2-amidinopropane)dihydrochloride (polymerization initiator). The resultant mixture was polymerized at a temperature of 60° C. for 3 hours (first-stage polymerization). Thereafter, 0.1 part of potassium persulfate was further introduced into the vessel. An emulsion prepared by emulsifying 46 parts of 2-ethylhexyl acrylate, 2.5 parts of butyl acrylate, one part of acrylonitrile, 0.5 part of acrylic acid, and one part of sodium lauryl sulfate in 33 parts of water was added dropwise thereto at 70° C. over 3 hours, during which the reaction mixture was polymerized (second-stage polymerization). The resultant reaction mixture was aged at 75° C. for 2 hours, subsequently cooled to room temperature, and then neutralized with 10% ammonia water. Thus, a pressure-sensitive adhesive (sometimes referred to as "Pressure-Sensitive Adhesive A") was prepared.

EXAMPLE 1

To 100 parts by weight, on a solid basis, of Pressure-Sensitive Adhesive A were added 2 parts of polyethylene glycol (weight-average molecular weight: 500,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) to have a thickness of 20 μm on a dry basis, and the coating was dried. Thus, a pressure-sensitive adhesive tape was obtained.

EXAMPLE 2

To 100 parts by weight, on a solid basis, of Pressure-Sensitive Adhesive A were added 10 parts of polyvinylpyrrolidone (weight-average molecular weight: 900,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m2 (base material) to have a thickness of 20 μm on a dry basis, and the coating was dried. Thus, a pressure-sensitive adhesive tape was obtained.

EXAMPLE 3

To 100 parts by weight, on a solid basis, of Pressure-Sensitive Adhesive A were added 5 parts of polyvinyl alcohol (weight-average molecular weight: 22,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) to have a thickness of 20 μm on a dry basis, and the coating was dried. Thus, a pressure-sensitive adhesive tape was obtained.

EXAMPLE 4

To 100 parts by weight, on a solid basis, of Pressure-Sensitive Adhesive A were added 0.5 part of poly(acrylic acid) (weight-average molecular weight: 90,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) to have a thickness of 20 μm on a dry basis, and the coating was dried. Thus, a pressure-sensitive adhesive tape was obtained.

COMPARATIVE EXAMPLE 1

To 100 parts by weight, on a solid basis, of Pressure-Sensitive Adhesive A was added 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) to have a thickness of 20 μm on a dry basis, and the coating was dried. Thus, a pressure-sensitive adhesive tape was obtained.

COMPARATIVE EXAMPLE 2

To 100 parts by weight, on a solid basis, of Pressure-Sensitive Adhesive A were added 0.3 part of polyethylene glycol (weight-average molecular weight: 1,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) to have a thickness of 20 μm on a dry basis, and the coating was dried. Thus, a pressure-sensitive adhesive tape was obtained.

COMPARATIVE EXAMPLE 3

To 100 parts by weight, on a solid basis, of Pressure-Sensitive Adhesive A were added 10 parts of polyethylene glycol (weight-average molecular weight: 1,000) and 0.3 part of an oil-soluble epoxy crosslinking agent (trade name "Tetrad C", manufactured by Mitsubishi Gas Chemical Company, Inc.). The resultant composition was applied to one side of Japanese paper having a basis weight of 30 g/m² (base material) to have a thickness of 20 μm on a dry basis, and the coating was dried. Thus, a pressure-sensitive adhesive tape was obtained.

(Evaluation Method)

With respect to the pressure-sensitive adhesive tapes obtained in Examples 1 to 4 and Comparative Examples 1 to 3, wet-surface pressure-sensitive adhesive force and constant-load peeling property were evaluated according to the following methods.

(Evaluation Method of Wet-Surface Pressure-Sensitive Adhesive Force)

A piece of glass as an adherend was stored for one hour in a box having a temperature set at 0° C. which had been installed in a thermo-hygrostatic chamber of 23° C.×65% RH. Thereafter, the glass piece was taken out of the box (at this time, the glass surfaces were in a dewy or wet state). After ten seconds, the pressure-sensitive adhesive tape cut into a width of 18 mm (the pressure-sensitive adhesive tape obtained in any of Examples 1 to 4 and Comparative Examples 1 and 3) was applied to the wet glass piece by rolling a 2-kg roller backward and forward once on the tape. After 10 seconds from the application, the tape was peeled off at an angle of 180° and a peeling rate of 300 mm/min to measure the pressure-sensitive adhesive force in application to the dewy or wet glass surface (sometimes referred to as "wet-surface pressure-sensitive adhesive force") (N/18-mm width). The results of this measurement are shown in the column of "Wet-Surface Pressure-sensitive adhesive force (N/18-mm width)" in Table 1.

(Evaluation Method of Constant-Load Peeling Property)

The pressure sensitive adhesive tape cut into a width of 18 mm was applied to an acrylic board by rolling a 500-g roller backward and forward once on the tape. After 30 minutes from the application, a load of 30 g was applied at the end of the tape and fixed to the acrylic board so as to make the peeling angle 90°. The peeling distance per hour was measured under the temperature of 23° C. The results are shown in the column of "Constant-load peeling property (cm/hr)" in Table 1.

TABLE 1

|  |  | Example | | | | Comparative Example | | |
|---|---|---|---|---|---|---|---|---|
|  |  | 1 | 2 | 3 | 4 | 1 | 2 | 3 |
| Hydrophilic polymer | Kind | PEG | PVP | PVA | PAA | none | PEG | PEG |
|  | Mw | 500,000 | 900,000 | 22,000 | 90,000 | — | 1,000 | 1,000 |
|  | Amount | 2 | 10 | 5 | 0.5 | — | 0.3 | 10 |
| Pressure-sensitive adhesive force (N/18-mm width) |  | 0.6 | 0.6 | 0.5 | 0.5 | 0.02 | 0.03 | 0.2 |
| Constant-Load Peeling Property (cm/hr) |  | 1.5 | 1.5 | 0.8 | 1.2 | 30 | 5.0 | 0.8 |

PEG polyethylene glycol
PVP polyvinylpyrrolidone
PVA poly(vinyl alcohol)
PAA poly(acrylic acid)
Mw weight-average molecular weight
The amount of the hydrophilic polymer is proportion per 100 parts by weight, on solid basis, of Pressure-Sensitive Adhesive A.

Table 1 shows that the pressure-sensitive adhesive tapes obtained in Examples 1 to 4 were superior to the pressure-sensitive adhesive tapes of Comparative Examples 1 to 3 in pressure-sensitive adhesive force in application to the dewy or wet glass surface. The tapes of the Examples were thus ascertained to have satisfactory pressure-sensitive adhesive force in application to wet surfaces. Moreover, the pressure-sensitive adhesive tapes of Examples 1 to 4 were confirmed to be also excellent in their constant-load peeling property. Thus, it has become clear that when an aqueous dispersion type pressure-sensitive adhesive composition, which contains a polyalkylene glycol having a weight-average molecular weight of from 20,000 to 5,000,000 or at least one hydrophilic polymer selected from polyvinylpyrrolidone, poly(vinyl alcohol)s and poly((meth)acrylic acid) in an amount of from 0.5 to 15 parts by weight per 100 parts by weight, on a solid base, of an acrylic or rubber-based pressure-sensitive adhesive composition of the aqueous dispersion type, is used as a pressure-sensitive adhesive constituting a pressure-sensitive adhesive layer of the pressure-sensitive adhesive tape, good initial pressure-sensitive force to dewy or wet surfaces and good constant-load peeling property can be obtained While the invention has been described in detail and with reference to specific embodiments thereof, it will be apparent to one skilled in the art that various changes and modifications can be made therein without departing from the spirit and scope thereof.

What is claimed is:

1. An aqueous dispersion type pressure-sensitive adhesive composition which consists essentially of a polyalkylene glycol having a weight-average molecular weight of from 450,000 to 1,000,000 in an amount of from 0.5 to 15 parts by weight per 100 parts by weight, on a solid basis, of an acrylic pressure-sensitive adhesive composition of the aqueous dispersion type containing an acrylic polymer having a glass transition point of $-20°$ C. or lower and a weight-average molecular weight of at least 200,000, whereby the polyalkylene glycol is incorporated into the composition in the form of an aqueous solution after the polymerization of the acrylic polymer and wherein the aqueous dispersion type pressure-sensitive adhesive composition has a property that when a pressure-sensitive adhesive product having a pressure-sensitive adhesive layer formed from the aqueous dispersion type pressure-sensitive adhesive composition is produced, the dewy or wet surface adhesive force thereof is 0.5 N/18 mm or more.

2. The aqueous dispersion type pressure-sensitive adhesive composition as claimed in claim 1, wherein the acrylic pressure-sensitive adhesive composition of the aqueous dispersion type comprises as a base polymer an acrylic polymer comprising a $C_{4-12}$ alkyl ester of (meth)acrylic acid as a main monomer component.

* * * * *